United States Patent [19]

Bacchialoni

[11] 3,886,385

[45] May 27, 1975

[54] RATE OF MOTION DETECTOR
[76] Inventor: Francesco L. Bacchialoni, 9 Claremont Ave., Arlington, Mass. 02175
[22] Filed: Nov. 15, 1972
[21] Appl. No.: 306,706

[52] U.S. Cl. .............. 310/152; 310/178; 310/229
[51] Int. Cl. ........................................ H02k 21/32
[58] Field of Search ..... 310/40 MM, 178, 179, 219, 310/223, 224, 229, 231, 266, 268, 152, 157, 171, 178, 168, 169, 170; 324/160, 163–165

[56] References Cited
UNITED STATES PATENTS

| 3,525,008 | 8/1970 | Burr | 310/268 |
|---|---|---|---|
| 3,539,852 | 11/1970 | Appleton et al. | 310/178 |
| 3,648,088 | 3/1972 | Wilkin et al. | 310/178 |

FOREIGN PATENTS OR APPLICATIONS

| 1,256,238 | 4/1960 | France | 310/178 |

Primary Examiner—J. D. Miller
Assistant Examiner—Harry E. Moose, Jr.

[57] ABSTRACT

The rate of motion of a relatively large body with respect to another body is detected by apparatus carried on the bodies. A magnet on one body provides a magnetic field between pole pieces and a set of relatively short electrical conductors, each conductor extending transversely from a relatively long electrical conductor, all carried on the other body, is positioned thereon to move through the magnetic field, one short conductor after another. An electrical contact contacts the extending end of at least one short conductor at a time while the contacted conductor is moving in the magnetic field, producing an electrical signal between the contact and the long conductor, which is representative of the rate of motion.

13 Claims, 8 Drawing Figures

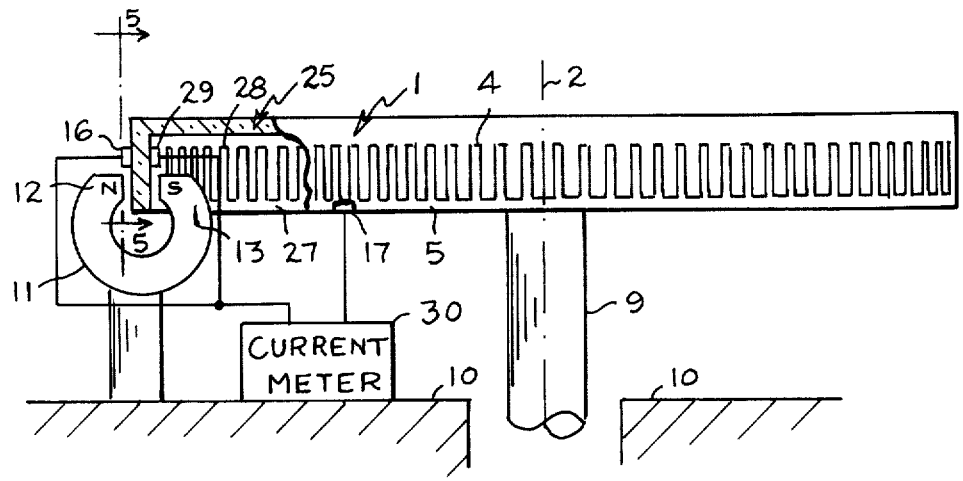
FIG 4
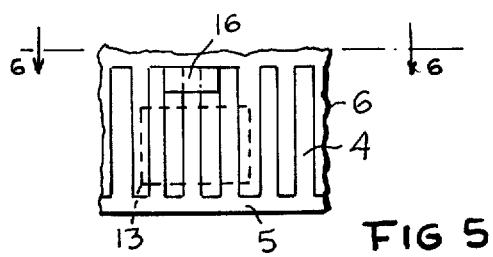
FIG 5
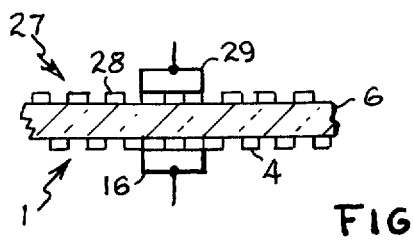
FIG 6
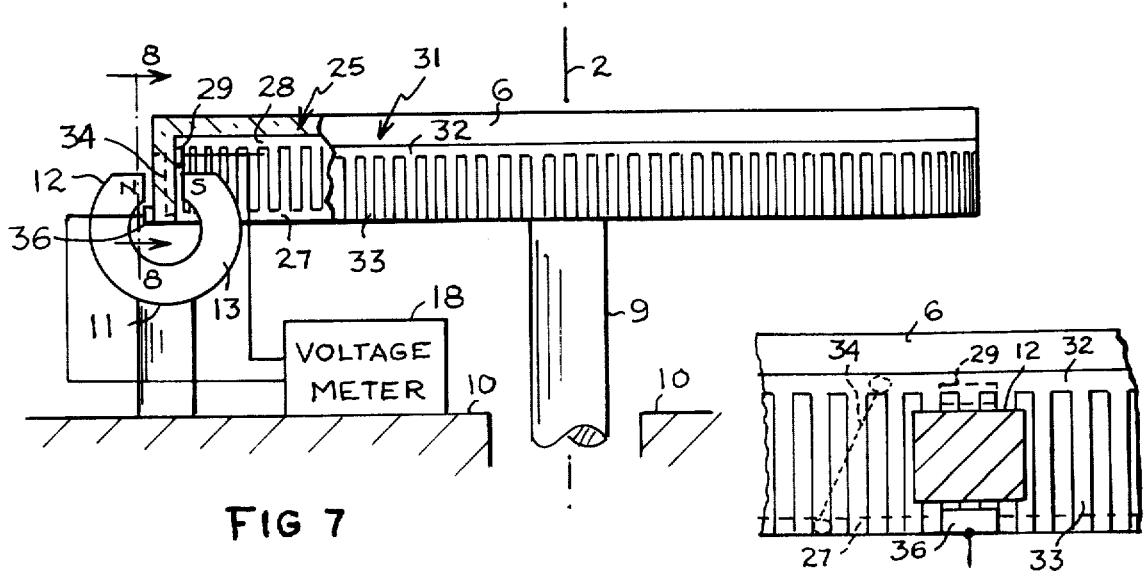
FIG 7
FIG 8

RATE OF MOTION DETECTOR

This invention relates to rate of motion detectors and particularly to a type of tachometer for accurately detecting a wide range of rates of rotation of a relatively large body with respect to another.

Heretofore, rotation rate detectors, sometimes called tachometer generators which are constructed and operate very much like a generator have been used to produce electrical signals representing the rotation rate of one body with respect to another. The tachometer generator includes a multitude of magnetic poles which are located either in the stator or the rotor of the tachometer and the tachometer produces an AC or a DC electrical signal which represents the rotation rate, depending upon whether brush contacts are used to provide the output signal. One type of tachometer generator which does not employ brushes and produces an AC output signal, includes a rotor carrying a plurality of magnetic poles and stator conductors surrounding the rotor alternately connected to opposite ends of a coil. The output from the coil is an AC signal and both the voltage and frequency of this AC signal increase as rotation rate of the rotor increases. The output voltage of the coil is calibrated to represent rotation rate and the accuracy of this calibration falls off very rapidly at rotational speeds below 100 rpm.

Another type of tachometer generator that produces a direct current voltage output signal representative of rotation rate includes a stator carrying a multitude of magnetic poles alternately arranged around a rotor which carries electrical conductors alternately arranged to define two sets of conductors. The ends of one set are contacted by a first arrangement of brush contacts and the ends of the other set are contacted by a second arrangement of brush contacts. The arrangement size and spacing of the brush contacts in each set is such that each contact in each set contacts a single conductor at a time. The output signal is produced across the two sets of brush contacts. This type of tachometer generator is reasonably accurate at relatively high speed, but like the brushless tachometer generator described above, accuracy falls off considerably at speeds below 100 rpm. Neither of these types of tachometer generators is useful for measuring the relatively slow rotations of large bodies with respect to each other except through elaborate gear trains required to drive the tachometers at high speed where these tachometers operate most accurately.

It is an object of the present invention to provide a device for producing an electrical signal representative of relatively low rotation rates.

It is another object of the present invention to provide a tachometer generator which produces an electrical signal which is representative of rotation rate over a range of rotation rates which includes several orders of magnitude of rotation rates.

It is a further object to provide a rate signal generator which produces a DC signal representative of rate and requires only a single pair of magnetic poles.

It is another object to provide a rate signal generator or tachometer generator which produces a DC signal which is proportional to velocity or rotation rate and is free of signal ripple.

In accordance with features with the present invention, a rate signal generator or tachometer generator provides a DC electrical signal substantially free of ripple and which represents linear or angular motion of one body with respect to another. The generator requires but a single pair of magnetic poles and two sliding electrical contacts which are mechanically stationary with respect to the magnetic pole. A body which moves relative thereto carries a plurality of short electrical conductors which extend from a long conductor defining a comb shape. This array or set of conductors move through the magnetic field while one of the brushes contacts the ends of two or more of the short conductors at a time while the conductors are passing through the magnetic field and the other brush contacts the long conductor, producing a DC electrical signal between the brushes which is substantially steady and free of ripple and the magnitude of this signal is directly proportional to the rate of motion of the body with respect to the magnet. This electrical signal is an accurate representation of rate of motion even at very low rates and when the structure is located at a relatively large radius from the axis of rotation of one body relative to another, the output signal is a precise measurement of very low rotation rates.

These and other objects, features and advantages of the present invention will be more clearly understood following a detailed description of a number of embodiments of the invention which represent the best known uses of the invention.

In this description, reference is made to the accompanying drawings in which:

FIG. 4 illustrates, in a partially sectioned view, another embodiment employing two sets of conductors on the rotating body which are similarly oriented so that the currents from similarly oriented brush contacts to each of these sets add to produce an output current signal;

FIG. 5 is an enlarged view of a portion of the rotating body showing the two sets of similarly oriented conductors carried thereon;

FIG. 6 is another view of the two sets of the similarly oriented electrical conductors carried by the rotating body;

FIG. 7 is a partially sectioned view of another embodiment in which there are located on the rotating body two sets of oppositely oriented electrical conductors and oppositely disposed contact brushes, one for each set, so that the voltage signals generated in each set add to produce an output voltage signal; and FIG. 8 is an enlarged view of a portion of the rotating body illustrating the two sets of oppositely oriented conductors and the relative positions of the magnetic pole piece and brush contacts.

Figure 1:
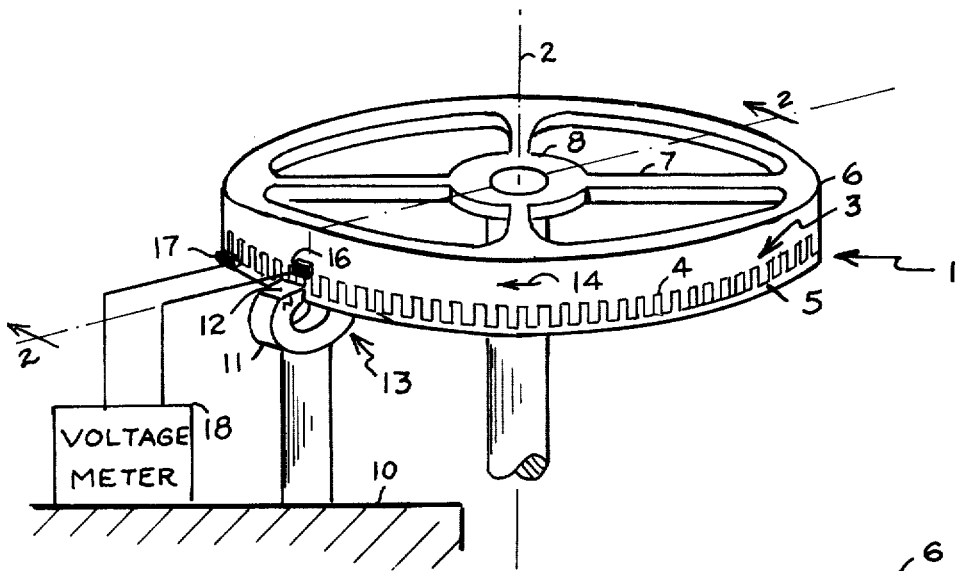
FIG. 1 is a perspective view representing a simple embodiment of the invention for measuring the rotation rate of a relatively large body.

Turning first to FIG. 1 there is illustrated a relatively simple embodiment incorporating the principal features of the present invention to measure the rotation rate of a relatively large body 1 about an axis 2. Along at least a portion of the periphery of the body 1, at a substantial radius from the axis 2, there is located a comb-like array or set 3 of electrical conductors. This includes a plurality of relatively short equally spaced conductors 4 all extending in the same direction from a relatively long conductors 5 so that the short conductors 4 are substantially parallel to the axis of the rotation 2 and the long conductor 5 from which the short conductors extend, lies along at least a portion of a circle concentric with the axis 2. This set of conductors is oriented on the outside of a rim 6 connected by arm 7 to a hub 8 on the axle 9 which rotates on the axis 2, the rotation being relative to a base 10.

Supported from the base 10 is a magnet 11 which bounds a magnetic field between the two pole pieces 12 and 13 thereof. The magnet is so oriented with respect to the rim 6 that the magnetic field is substantially radial with respect to the axis 2 and the short electrical conductors 4 move through this magnetic field as the axle 9 rotates about the axis 2. If, for example, the pole piece 12 of the magnet 11 is the north pole and the rim 6 rotates in the direction of arrow 14, then an electrical voltage is produced across each short electrical conductor 4 as it moves through the magnetic field of the magnet and the direction of this voltage is represented by arrow 15.

Figure 2:
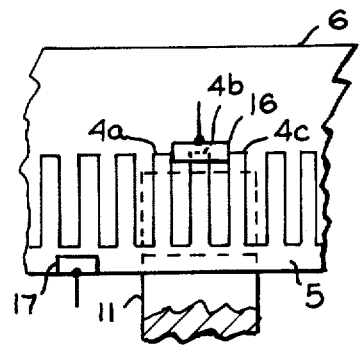
FIG. 2 is an enlarged view of a portion of the array or set of conductors carried by the rotating body in FIG. 1.

An electrical brush contact also carried by the base 10, contacts the free end of the short electrical conductors 4 as these conductors pass through the magnetic field bounded by the pole pieces of the magnet. This brush contact 16, shown more clearly in FIG. 2, is of sufficient size to contact the ends of at least 2 of the short conductors 4 at a time while the conductors are moving through the magnetic field bounded by the magnet pole pieces. As shown in FIG. 2, the brush 16 is in contact with three of the short electrical conductors, denoted as 4a, 4b and 4c, while these conductors are in the field bounded by the pole pieces 12 and 13. A second electrical brush contact 17, is in continuous contact with the long electrical conductor 5, and is also supported by the base 10 and may contact conductors 5 where convenient, as it is not necessary that this contact be at the magnetic field. The two brush contacts are electrically connected to a voltage meter 18 which may be calibrated to read rotation rate as the voltage across the brush contacts is proportional to the rotation rate of the rim 6 about the axis 2.

Clearly, the magnitude of the output voltage signal will depend upon the rate at which the conductors 4 move across the magnetic field, the strength of the magnetic field and the dimensions of the magnetic field. If the dimensions of the magnetic field are relatively small, then the spacing between the short conductors 4 must be sufficiently small to insure that at least two of these conductors are simultaneously in the magnetic field at any one time and that the electrical brush contact 15 contacts the ends of at least two of these conductors while they are passing through the magnetic field. The voltage signal is of significant magnitude even for a very low rotation rate provided the radius to the rim 6 is relatively large, because of the voltage produced is proportional to the velocity of the conductor through the magnetic field and that velocity is proportional to the product of rotation rate times the radius to the rim. Hence, this structure for measuring rate is particularly useful to measure relatively low rates or rotation of a relatively large body which provides the necessary large radius to the array of electrical conductors.

The simplest form of the present invention includes a single magnet and single comb-shaped set or array of electrical conductors and at least one electrical brush contact. Clearly, the magnet could be located on the rotating body along with the brush contact and the voltage meter and array of conductors could be located on the stationary body to provide an indication on the rotating body of its rotation rate. Other embodiments incorporating these features of the invention make use of a single set of electrical conductors and a plurality of magnets, and still others employ two sets of electrical conductors. In one case the two sets of conductors on the same body are oriented the same as shown in FIG. 4 to combine the substantially constant DC current from each set, producing a current signal output. In another case the two sets are reversed as in FIG. 7 so that the voltage across each set can be added and so the output is preferably a voltage signal.

In all embodiments of the present invention herein described, a brush contact is provided for contacting the ends of the short conductors in a set as those conductors pass through the magnetic field. The electrical signal output is produced between the brush contact and the long conductor of the set. The electrical connection to the long conductor may be brush contact or a flexible conductor. Where the total rotation angle of one body with respect to the other is limited, the electrical connection to the long conductor of the set need not be a brush and may be a flexible conductor instead. All embodiments described herein show a brush contact to the long conductor and so they include at least two brush contacts. In any of these embodiments, rotation angle could be limited and the flexible conductor substituted for the brush to the long conductor.

Figure 3:
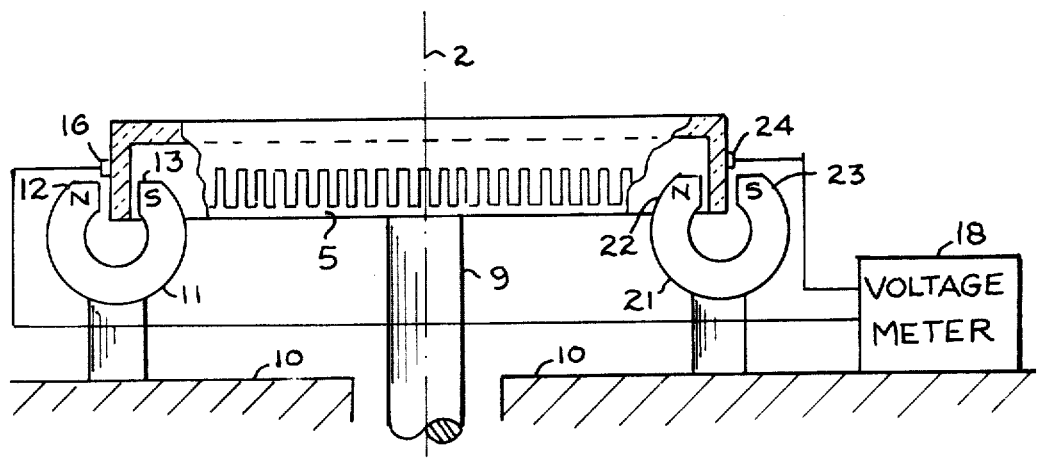
FIG. 3 is a partially sectioned view of another embodiment for measuring the rotation rate of a relatively large body employing two spaced magnets with poles oppositely arranged relative to the array of conductors carried by the large rotating body.

In FIG. 3, a structure similar to the structure in FIGS. 1 and 2, is provided with a second magnet 21 at any other location about the periphery of the rim 6 and supported from the base 10. An electrical brush contact 24, oriented with respect to the magnet 21, just as contact 15 is oriented with respect to magnet 11, is substituted for the brush 17. The relative orientation of brush 24 with respect to magnet 21 and the size of this brush with respect to the conductors 4 is just as already described above with reference to brush contact 15 and magnet 11 shown in FIG. 2. In operation, the voltage produced between brushes 15 and 24 in this embodiment (all other factors being equal) is twice the voltage produced between the brushes 15 and 17 in the embodiment shown in FIG. 1. Thus, the addition of a second magnet provides a greater output voltage for the same rotation rate, all other factors bein the same.

In FIG. 4, there is shown an embodiment employing a single magnet and comb-like sets of conductors on the inside and the outside of the rim 6. The comb-like set of conductors 1 consisting of short conductors 4 extending from long conductor 5 is located on the outside of the rim 6 just as in FIG. 1 and 3. In addition, on the inside of the rim 6 there is located a second set 25 of electrical conductors consisting of short conductors 28 and long conductor 27. The long conductors 27 and 5 connect electrically at the tim 6 and may be in fact the same conductor. However, the short conductors 4 and 28 on the outside and inside, respectively, of the rim 6 contact different brushes. The short conductors 4 in the set 1 are contacted by brush 15, just as in the embodiment of FIGS. 1 and 2, while the short conductors 28 of set 25 on the inside of the rim are contacted by another electrical brush contact 29. The brush contact 29 contacts two or more of the conductors 28 while these conductors are passing through the field of magnet 11. A third electrical brush contact 17 in this embodiment may be oriented just as shown in FIGS. 1 and 2.

Since the same voltage is produced at contacts 15 and 29 with respect to the voltage of contact 17, the contacts 15 and 29 are electrically connected so that the electrical currents from these contacts add. A meter 30 produces an indication of this current which represents the rotation rate of rim 6 on the axis 2.

In order to further insure against the possibility of any ripple in the current signal to the meter 30 in FIG. 4, it is preferred that the short conductors 28 and 4 in the sets 27 and 1 respectively, be oriented with respect to each other (as viewed from the end of these conductors) as shown in FIGS. 5 and 6. The conductors 28 and 4 are staggered with respect to each other so that while brush contact 29 is spanning two of conductors 28, the brush contact 15 is spanning three of conductors 4 and vice versa. This staggered relationship of the conductors 28 and 4 insures that while one of the brushes 29 or 15 is sliding into a conductor at the given instant of time, the other brush is not.

Turning next to FIGS. 7 and 8, there is shown an embodiment very similar to the embodiment shown in FIGS. 4 to 6. Here, however, the comb-like sets of electrical conductors on the inside and outside of the rim 6 are not oriented the same, but are reversed with respect to each other. Here, the set denoted 27 on the inside of the rim 6 is the same as in FIG. 4, but the set outside, denoted 31 is oriented oppositely to the inside set. The set of conductors 31 including a long conductor 32 from which extend short conductors 33 has the short conductors extending in a direction opposite to the direction of extension of the short conductors 28. There is no direct electrical connection between the long conductor 29 and the free ends of the short conductor 33. However, the long conductor 28 in the set 27, and the long conductor 32 in the set 31 are directly electrically connected at the rim. These are connected for example, by the conductor 34 which may be embedded in the rim 6. This is shown more clearly in the enlarged view of a portion of the rim at the location of the magnet illustrated in FIG. 8.

The electrical brush contact 36 to the outside set in the embodiment in FIG. 7 is on the outside of the rim and contacts the free ends of the conductors 33 of the set. Brush 36 contacts conductors 33 while these conductors are moving through the magnetic field of the magnet 11 and the contact is preferably made to at least two of the conductors 33 at the time while these conductors are moving through the magnetic field, just as already described with respect to the other electrical brush contacts to the ends of short conductors.

The structure in the FIG. 7 places two separate comb-like sets of electrical conductors in the magnetic field of the magnet at the same time and these sets are electrically connected and contacted by the brush contacts so that the voltages produced in each set add. In other words the voltage between the brush contacts 29 and 36 is twice the oltage that would be produced by the structure shown in FIGS. 1 and 2, all other factors being equal.

The embodiments of the present invention described herein all include the fundamental novel features of the invention. The invention is particularly useful to measure accurately even at very low rates, the rate of rotation of a relatively large body by locating along at least a portion of a periphery of the body a set of electrical conductors which can be printed on the periphery and which pass through a stationary magnetic field provided by a small magnet. An electrical signal produced between brushes stationary with the magnet represents te rotation rate of the body. In an application where the angle of rotation of the body is limited, the set of conductors would be located on only a portion of the rim subtending the angular limitation and the brush contact to the long conductor in the set could be replaced by a flexible conductor directly connected to the long conductor. Accordingly, where the rotational angular range of the body is small, the length of the set of conductors may be correspondingly small.

The embodiments of the invention described herein are intended to point out the fundamental novel features of the invention and it is to be understood that various omissions, substitutions and changes in form and detail may be made by those skilled in the art without the departing from the spirit and scope of the invention as set forth in the appended claims.

What is claimed is:

1. Apparatus for detecting the rate of motion of one body relative to another body comprising in combination, means supported by one of said bodies for producing a substantially steady magnetic field, at a given area which is fixed relative to said supporting body, a set of electrical conductors fixed to the other of said bodies including a relatively long electrical conductor which is continuous from one end to the other end thereof and a plurality of relatively short electrical conductors, the short conductors being disposed side by side and each electrically connected at one end only to the long conductor at spaced points therealong, the orientation of he set on said other body being such that the short conductors enter and leave said magnetic field area one after another at a rate proportional to the said relative rate of motion, and an electrical contact for contacting the other end of at least one of the short conductors at a time while said contacted short conductor is in the magnetic field, whereby a signal is produced between the contact and the long conductor, said signal being representative of the said rate.

2. Apparatus as in claim 1 wherein,
the short conductors are substantially evenly spaced along the long conductor,
whereby said electrical signal is a train of substantially overlapping regular impulses.

3. Apparatus as in claim 1 wherein,
the short conductors are disposed on the other body transverse to the direction of the relative motion.

4. Apparatus as in claim 1 wherein,
the short conductors are disposed on the other body so that they are transverse to the magnetic field as they pass through the field.

5. Apparatus as in claim 1 wherein,
the long conductor is oriented substantially parallel to the direction of the relative motion and the short conductors are transvere to the direction of motion of one of the bodies relative to the other body.

6. Apparatus as in claim 5 wherein,
the relative motion is transverse to the direction of the magnetic field.

7. Apparatus as in claim 1 wherein,
the electric contact is a sliding contact substantially fixed relative to the one body,
a second electrical sliding contact substantially fixed relative to the one body contacts the long conductor, and
the signal is produced between said electric contacts.

8. Apparatus as in claim 1 wherein,
the electrical contact is a sliding contact substantially fixed relative to the one body,
a flexible electrical conductor connects to the long conductor, and
the signal is produced between the contact and the flexible conductor.

9. Apparatus as in claim 1 wherein,
two of said sets of conductors are included on opposite sides of the one body so that the short conductors of the two set simultaneously pass through the magnetic field, and
different sliding electrical contacts contact at least one of the short conductors of each set at a time while said contacted short conductor is in the magnetic field.

10. Apparatus as in claim 9 wherein,
the short conductors in one set extend from the long conductor thereof in the same direction as the short conductors in the other set extend from the long conductor thereof.

11. Apparatus as in claim 9 wherein,
the short conductors in one set extend from the long conductor thereof in the opposite direction as the short conductors in the other set extend from the long conductors thereof.

12. Apparatus as in claim 10 wherein,
the sliding electrical contacts are electrically connected, and
the signal is a current signal.

13. Apparatus as in claim 11 wherein,
the signal is produced between the sliding contacts and is a voltage signal.

* * * * *